United States Patent [19]

Evans

[11] 4,342,070
[45] Jul. 27, 1982

[54] ANCHORING APPARATUS FOR AN ELECTRICAL DEVICE

[75] Inventor: William J. Evans, Indianapolis, Ind.

[73] Assignee: Emhart Industries, Inc., Indianapolis, Ind.

[21] Appl. No.: 131,437

[22] Filed: Mar. 18, 1980

[51] Int. Cl.³ .......................................... H01G 9/06
[52] U.S. Cl. .............................. 361/433; 174/52 S; 361/272
[58] Field of Search ................ 361/433; 174/52 S; 29/570; 361/272

[56] References Cited

U.S. PATENT DOCUMENTS 2,177,018  10/1939  Claassen et al. .................. 361/433
3,697,824  10/1972  Greskamp ......................... 361/433
4,074,417   2/1978  Pearce et al. ..................... 29/570

Primary Examiner—James W. Davie
Attorney, Agent, or Firm—Robert F. Meyer; David W. Gomes

[57] ABSTRACT

An electrical device includes a housing having an open end for receiving an electrical component, a rigid member for sealing the open end to contain the electrical component within the housing, and an apparatus positioned between the electrical component and the rigid sealing member for anchoring the electrical component within the housing. The anchoring apparatus includes a center section, at least two angularly spaced arms extending radially outward from the center section, a locator extending axially outward from the center section for engaging the electrical component, posts extending axially outward from each of the arms for engaging the rigid sealing member to restrict movement of the center section and the arms relative to the rigid sealing member, and a plurality of spaced fingers extending axially outward from the arms for engaging the electrical component.

7 Claims, 4 Drawing Figures

ANCHORING APPARATUS FOR AN ELECTRICAL DEVICE

The present invention relates to electrical devices of the type which include a housing having an open end for receiving an electrical component and a rigid member for sealing the open end to encapsulate the electrical component within the housing. More particularly, the present invention relates to means positioned between the electrical component and the rigid sealing member for anchoring the electrical component within the housing.

Many electrical devices having an electrical component encapsulated within a housing are employed in applications where they are subject to great amounts of mechanical vibration. Accordingly, unless the electrical component is secured within the housing of the electrical device, the electrical component may move both horizontally and vertically within the housing. Such movement can result in harmful damage to the electrical device.

One of the earliest ways of anchoring the electrical component within the housing was to place tar or asphalt in the bottom of the housing around the electrical component. However, it has been found that while the tar or asphalt is adequate to prevent movement of the electrical component in many applications, it does not prevent harmful movement in applications involving great amounts of mechanical vibration.

Accordingly, many anchoring devices have been developed in an effort to secure the electrical component within the housing to prevent harmful movement of the electrical component when the electrical device is subjected to a great amount of mechanical vibration. Examples of these prior anchoring devices are described in U.S. Pat. Nos. 2,758,258; 2,758,259; 2,856,570; 3,439,234; 3,463,969; and 3,697,824. It should be noted that, for the most part, U.S. Pat. Nos. 2,758,258; 2,758,259; 2,856,570; 3,439,234; and 3,463,969 disclose anchoring devices which are positioned in the bottom of the housing, thereby replacing the tar or asphalt to secure the electrical component within the housing. In contrast, U.S. Pat. No. 3,697,824 discloses an anchoring device which is positioned between the electrical component and a lid closing the housing so that the tar or asphalt can also be employed in the bottom of the housing to prevent harmful movement of the electrical component within the housing.

One of the problems associated with the anchoring device disclosed in U.S. Pat. No. 3,697,824 relates to the assembly of the electrical device. Furthermore, it has been found that, in applications involving extreme mechanical vibrations, the electrical component is still subject to some movement within the housing. In particular, the electrical component can still move vertically within the housing.

It is, therefore, one object of the present invention to provide an improved means for anchoring the electrical component within the housing of an electrical device wherein the anchoring means can be pre-assembled to the lid of the housing prior to attachment of the electrical connections associated with the electrical component to the terminals positioned in the lid. This particular feature allows the use of electrical connections of minimum length.

According to the present invention, it is a further object to provide an anchoring means for the top of an electrical device assembly which locks into the molded terminal lid of the housing of the assembly. In accordance with this locking feature, the anchoring means can hold an extremely large electrical component and restrict both vertical and horizontal movement of the electrical component within the housing of the electrical device.

Further, according to the present invention, the anchoring means includes a hub, at least two angularly spaced arms extending radially outward from the hub, means extending axially outward from the hub for engaging the electrical component, and means for engaging both the lid of the housing of the electrical device and the arms to restrict movement of the hub and arms relative to the lid.

A capacitor according to the present invention includes a housing with a concavity at one end thereof, a capacitor body with unfilled space at one end thereof, the capacitor body within the housing and the unfilled space thereof a short distance from the concavity of the housing, and restraining means between the concavity and the unfilled space of the capacitor body, the restraining means including convexities projecting into the unfilled space of the capacitor body and the concavity of the housing to restrain the capacitor body against harmful movement relative to the housing.

While various features and advantages of the present invention have been described above, other features and advantages will become apparent in view of the following detailed description of one embodiment thereof, which description should be considered in conjunction with the following drawings, in which.

Figure 1:
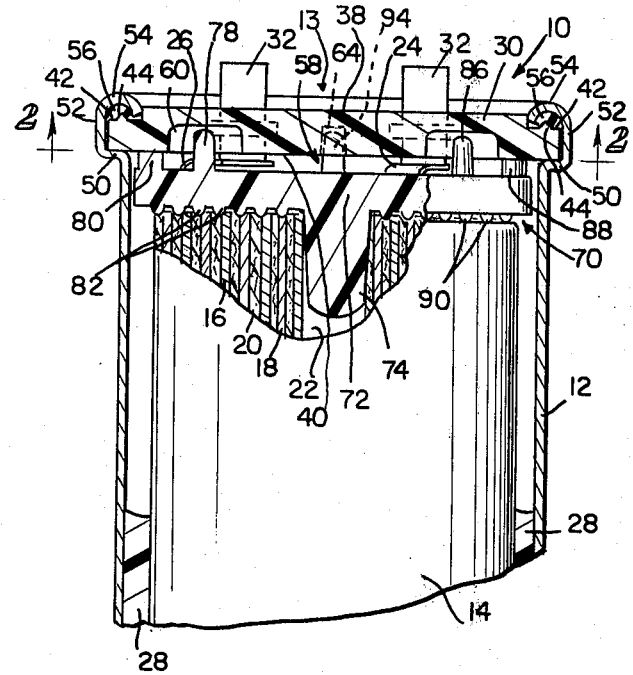
FIG. 1 is a partly sectioned side elevational view of an electrical device including the anchoring means according to the present invention.

Referring now to the drawings and in particular to FIG. 1, the anchoring device of the present invention is most advantageously employed in an electrical device 10 which includes a cylindrical container, can, or housing 12 having a closed end (not shown) and an open end 13 forming a cavity for receiving an electrical component 14. Illustratively, the electrical device 10 is a capacitor of the electrolytic type and the housing 12 is made of a metal or metal alloy, such as aluminum, or a thermoplastic material. A cylindrical capacitor body 14 includes a convolutely wound capacitor cartridge formed by a plurality of metal electrodes 16, 18 constructed of any suitable film-forming metal such as aluminum, tantalum, and the like and a plurality of spacer members 20 constructed of a dielectric material such as porous paper or the like which is impregnated with a liquid electrolyte of a known composition. The metal electrodes 16, 18 and the spacer members 20 are wound concentrically within the capacitor body 14 around an unfilled core 22 extending axially within the capacitor body 14. Projecting axially outward from the capacitor body 14 and connected to the metal electrodes 16, 18 are two connection leads 24, 26.

Continuing to refer to FIG. 1, the capacitor body 14 is positioned within the housing 12 and a thermally conductive and antivibratory medium such as a potting composition, tar, or asphalt 28 is provided in the bottom of the housing 12 to partially fill the housing 12 and limit movement of the electrical body 14 within the housing 12. It should be understood that an anti-vibratory means such as those illustrated in U.S. Pat. Nos. 2,856,570, 3,439,234 and 2,758,259 can be used in lieu of a potting composition.

Seated in the open end 13 of the housing 12 is a rigid disc of insulating material such as, for example, a phenolic resin for sealing the housing 12 and thereby containing or encapsulating the capacitor body 14 within the housing 12. The rigid sealing member 30 includes two terminal lugs 32 extending axially outward from the rigid sealing member 30 to provide external electrical connections for the electrical device 10. The rigid sealing member 30 includes two apertures 34 through which the terminal lugs 32 are extended to be attached to the two connection leads 24, 26 of the capacitor body 14. As best illustrated in FIGS. 2 and 3, the terminal lugs 32 each include protrusions 36 for attaching the electrical connection leads 24, 26 thereto.

Figure 3:
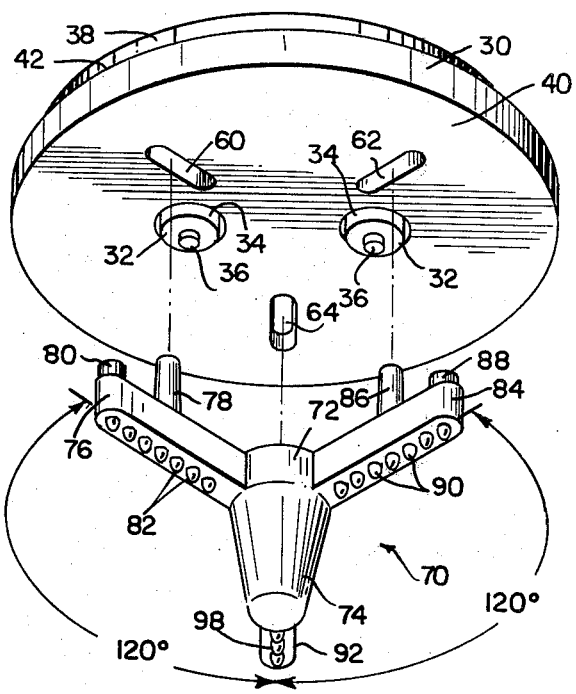
FIG. 3 is an exploded view of sections of the electrical device of FIG. 1 illustrating the anchoring means according to the present invention.

As illustrated in FIGS. 1 and 3, the rigid sealing member 30 includes a top surface 38 and a bottom surface 40 having interposed therebetween an annular flange 42 used to secure the rigid sealing member 30 to the housing 12 in a manner to be described. Provided on the flange 42 is an annular ridge 44.

The housing 12 includes a radially outwardly extending annular seating portion 50 and a wall portion 52 extending axially upward from the seating portion 50 which are provided for seating and securing the rigid sealing member 30 to the housing 12. The axially extending wall portion 52 includes an upper end 54 which, as best illustrated in FIG. 1, is bent inwardly to secure a sealing rubber O-ring 56 against the annular flange 42 of the rigid sealing member 30 to secure the rigid sealing member 30 to the housing 12. As can be seen in FIG. 1, when the rigid sealing member 30 is secured to the housing 12, a space 58 remains between the rigid sealing member 30 and the capacitor body 14 for the positioning of an anchoring means according to the present invention.

Figure 2:
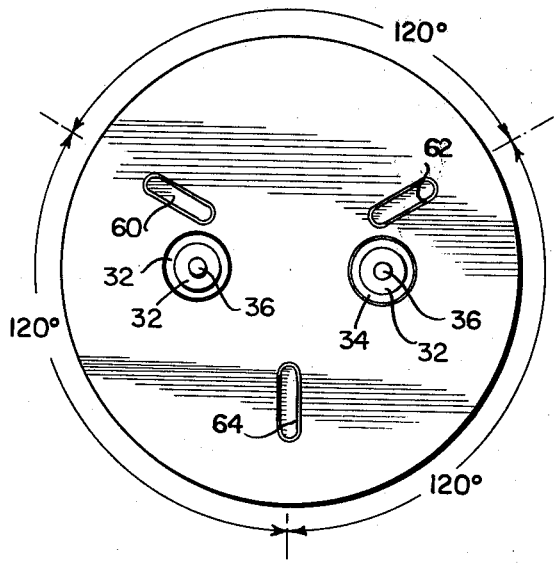
FIG. 2 is a cross-sectional view of the electrical device of FIG. 1 taken generally along section lines 2—2.

Referring now to FIGS. 2 and 3, in accordance with the present invention, the rigid sealing member 30 includes first, second, and third elongated, radially extending concavities 60, 62, and 64, respectively, formed in the bottom surface 40 of the rigid sealing member 30. Improtantly, these concavities 60, 62, and 64 are truncated and extend only partially into the rigid sealing member 30 so that they do not penetrate the top surface 38 of the sealing member 30. As particularly illustrated in FIG. 2, the concavities 60, 62, and 64 form a Y in relation to the center of the rigid sealing member 30 and are angularly spaced 120° apart from each other. As can further be seen in FIGS. 2 and 3, the concavities 60, 62, and 64 do not interfere with the location of the two terminal lugs 32 in the rigid sealing member 30. Furthermore, each of the concavities is tapered from the opening on the bottom surface 40 of the sealing member 30 to the bottom of the concavity approximately 1.5°.

Referring now to FIGS. 1 and 3, a means 70 positioned in the space 58 between the capacitor body 14 and the rigid sealing member 30 for anchoring the capacitor body 14 within the housing 12 is generally Y-shaped. Illustratively, the anchoring means 70 is made from a high-impact plastic material such as, for example, a glass-filled nylon or thermoplastic polyester. The anchoring means 70 includes a cylindrical central hub section 72 and an axially extending, downwardly projecting frustoconically shaped locator 74 which projects into the unfilled core 22 of the capacitor body 14. A first arm 76 extends radially outward from the central hub section 72 and includes an axially extending, upwardly projecting post 78 correspondingly positioned on the arm 76 relative to the first concavity 60. The first arm 76 further includes an axially extending, upwardly projecting, stand-off boss 80 for engaging the bottom surface 40 of the rigid sealing member 30 when the post 78 engages the concavity 60 to orient the arm 76 in spaced relationship to the rigid sealing member 30. Importantly, the post 78 is also tapered at approximately 1.5° with its maximum diameter in proximity to the arm 76. The first arm 76 also includes a plurality of axially extending, downwardly projecting fingers 82 for engaging the top of capacitor body 14.

A second arm 84 extends radially outward from the central hub section 72 and includes a second axially extending, upwardly projecting post 86 located on the second arm 84 to correspond to the concavity 62. The second arm 84 also includes a second axially extending, upwardly projecting, stand-off boss 88 for engaging the bottom surface 40 of the sealing member 30 to orient the arm 84 in spaced relationship to the rigid sealing member 30. Post 86 is also tapered at approximately 1.5°. Further, the second arm 84 includes a plurality of axially extending, downwardly projecting fingers 90 for engaging the top of capacitor body 14.

A third arm 92 extends radially outward from the central hub section 72 and includes a third axially extending, upwardly projecting post 94 located on the third arm 92 to correspond to the concavity 64, a third axially extending, upwardly projecting stand-off boss 96 for engaging the bottom surface 40 of the sealing member 30 when the third post 94 engages the third concavity 64 to orient the arm 92 in spaced relationship to the rigid sealing member 30, and a plurality of axially extending, downwardly projecting fingers 98 for engaging the top of capacitor body 14. Post 94 is likewise tapered at approximately 1.5°.

Continuing to refer to FIG. 3, each of the arms 76, 84, and 92, is angularly spaced 120° apart to thereby correspond to the angular space between the concavities 60, 62, and 64, respectively. Accordingly, the axially extending, upwardly projecting posts 78, 86, and 94 associated with each of the radially extending arms 76, 84, and 92, respectively, fit into the engage the concavities 60, 62, and 64, respectively, in the sealing member 30; the axially extending, downwardly projecting locator 74 engages the unfilled core 22 of the capacitor body 14; and the plurality of axially extending, downwardly projecting fingers 82, 90, and 98, respectively, engage the top surface of the capacitor body 14 to restrict horizontal and rotational movement of the capacitor body 14 relative to the sealing member 30. Furthermore, the axially extending, upwardly projecting, stand-off bosses 80, 88, and 96, respectively, engage the bottom surface 40 of the sealing member 30 to restrict vertical movement of the electrical component 14 within the housing 12.

Figure 4:
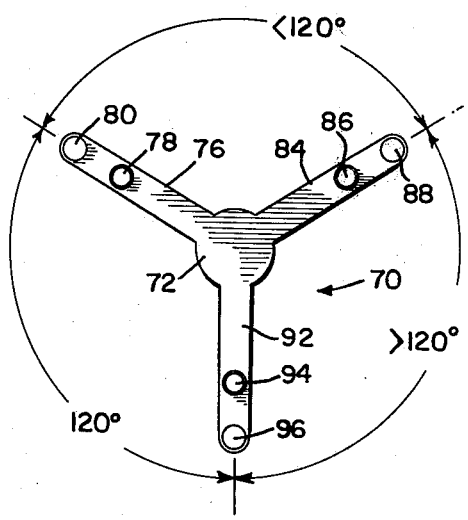
FIG. 4 is a top elevational view of the anchoring means showing the relationship of its various parts.

Referring now to FIG. 4, one of the arms 84 is angularly spaced at an angle slightly smaller than 120° from another arm 76 and is angularly spaced at an angle slightly greater than 120° from another arm 92 so that when the posts 78, 86, and 94 are inserted into the concavities 60, 62, and 64, respectively, they tightly engage the concavities 60, 62, and 64 so that surface friction between the posts 78, 86, and 94 and the concavities 60, 62, and 64, respectively, secures the anchoring means 70 to the rigid sealing member 30. Illustratively, the angular space between arms 84 and 76 is approximately 1° or 2° less than 120°; and correspondingly the angular space between arms 84 and 92 is approximately 1° or 2° greater than 120°. This particular feature facilitates the pre-assembly of the rigid sealing member 30 and the anchoring means 70 prior to attachment of the connection leads 24, 26 to the terminal lugs 32. Importantly, the capacitor body 14; connection lead 24, 26; and the anchoring means 70 can all be pre-assembled to the rigid sealing member 30 piror to the sealing member 30 being seated and secured to the housing 12 of the electrical device 10.

What is claimed is:

1. In an electrical device including a housing having an open end for receiving an electrical component and a rigid member for sealing the open end to contain the electrical component within the housing, the improvement comprising: means positioned between the electrical component and the rigid sealing member for anchoring the electrical component within the housing; the anchoring means including a hub, at least two angularly spaced arms extending radially outward from the hub, a plurality of fingers extending axially outward from each of said angularly spaced arms and engaging said electrical component, means extending axially outward from the hub for engaging the electrical component; and means for engaging both the rigid sealing member and the arms to restrict movement of the hub and arms relative to the rigid sealing member.

2. The improvement as recited in claim 1 wherein the means engaging both the rigid sealing member and the arms includes at least two radially extending cavities formed in the rigid sealing member, the cavities being correspondingly angularly spaced in relation to the angular space between the arms, and at least two posts extending axially outward from the arms for engaging the cavities.

3. The improvement as recited in claim 1 wherein the anchoring means includes three radially extending, angularly spaced cavities formed in the rigid sealing member, three angularly spaced arms extending radially outward from the hub, the angular space between the arms corresponding to the angular space between the cavities, three posts extending axially outward from the arms for engaging the cavities, and a plurality of fingers extending axially outward from the arms for engaging the electrical component.

4. The improvement as recited in claim 3 wherein the anchoring means is generally Y-shaped and the angular spaces between the arms and between the cavities are generally equal to 120°.

5. The improvement as recited in claim 4 wherein the angle between two of the arms is slightly smaller than 120° to create surface friction between the posts associated with the two arms and two of the cavities.

6. The improvement as recited in claim 1 further comprising at least two bosses protruding axially outward from the arms to orient the hub and arms in spaced relationship to the rigid sealing member.

7. A capacitor comprising a housing with a concavity at an end thereof, a capacitor body with unfilled space at an end thereof, the capacitor body within the housing and the unfilled space thereof a short distance from the concavity of the housing, and restraining means between the concavity and the unfilled space of the capacitor body, the restraining means including a center section, a plurality of arms extending radially outward from the center section, means extending axially outward from the center section for projecting into the unfilled space of the capacitor body, and means extending axially outward from the arms for projecting into the concavity of the housing.

* * * * *